United States Patent Office 3,781,350
Patented Dec. 25, 1973

3,781,350
PROCESS FOR PREPARATION OF ω-HYDROXY SATURATED ALIPHATIC MONOCARBOXYLIC ACIDS
Yutaka Fujita, Toshiki Toda, and Tsuneo Shimada, Iwakuni, Japan, assignors to Teijin Limited, Osaka, Japan
No Drawing. Filed July 6, 1972, Ser. No. 269,305
Claims priority, application Japan, July 9, 1971, 46/50,849; Sept. 29, 1971, 46/76,194; Oct. 2, 1971, 46/77,297, 46/77,298; Oct. 30, 1971, 46/86,401
Int. Cl. C07c 59/04
U.S. Cl. 260—535 R        11 Claims

ABSTRACT OF THE DISCLOSURE

Saturated aliphatic dicarboxlic acids of 4 to 12 carbon atoms can be converted to the corresponding ω-hydroxy saturated aliphatic monocarboxylic acids in high yields and with high selectivity when they are contacted with hydrogen together with saturated aliphatic glycols of the same number of carbon atoms in the presence of a catalyst comprising (1) metallic cobalt derived by reducing at least one cobalt compound (first component) selected from the group consisting of cobalt oxides, cobalt carbonates and cobalt hydroxides and (2) a metal and/or a metal compound derived by reducing at least one compound (second component) selected from the group consisting of phosphates, borates, molybdates and tungstates of iron, zinc or cobalt, oxides and hydroxides of iron, rhenium, zinc, phosphorus, boron, molybdenum or tungsten, and carbonates of iron or zinc.

---

This invention relates to a process for the preparation of ω-hydroxy saturated aliphatic monocarboxylic acids of 4 to 12 carbon atoms. More particularly, the invention relates to a novel process for hydrogenating saturated aliphatic dicarboxylic acids of 4 to 12 carbon atoms to produce ω-hydroxy saturated aliphatic monocarboxylic acids of the same carbon number.

Conventional processes for preparing ε-hydroxycaproic acid, which is an ω-hydroxy saturated aliphatic monocarboxylic acid containing 6 carbon atoms, include, for example, the following two processes as the most widely practiced methods.

(1) Process comprising reacting cyclohexanone with peracetic acid to form ε-caprolactone and hydrolyzing it to ε-hydroxycaproic acid; and
(2) Process comprising oxidizing cyclohexane or a mixture of cyclohexane and cyclohexanone with air to thereby form a substantially 50:50 mixture of ε-hydroxycaproic acid and adipic acid.

However, these conventional processes are insufficient and disadvantageous. For instance, the above process (1) is defective in that expensive and explosive peracetic acid must be employed and acetic acid is formed as a by-product. Also the process (2) is disadvantageous in that adipic acid is formed as a by-product in an amount approximately equal to the amount of the intended product, ε-hydroxycaproic acid.

Accordingly, an object of this invention is to provide a process which can convert a saturated aliphatic dicarboxylic acid of 4 to 12 carbon atoms selectively to the corresponding ω-hydroxy saturated aliphatic monocarboxylic acid (i.e., a monocarboxylic acid having the same number of carbon atoms as of the starting dicarboxylic acid) by a single-stage reaction.

Another object of this invention is to provide a novel process for converting adipic acid to ε-hydroxycaproic acid with high conversion and high selectivity by a single-stage reaction.

Still another object of this invention is to provide a catalyst composition for use in the process for preparing ω-hydroxy saturated aliphatic monocarboxylic acids of 4 to 12 carbon atoms, especially ε-hydroxycaproic acid, which has a high catalytic activity and gives intended ω-hydroxy monocarboxylic acids, especially ε-hydroxycaproic acid, with high selectivity while reducing formation of by-products to a very low level, and to provide a method of preparing such catalyst composition.

Other objects and advantages of this invention will be apparent from the description given hereinbelow.

Our joint research workers previously found that ω-hydroxy saturated aliphatic monocarboxylic acids of 4 to 12 carbon atoms can be prepared in high yields with high selectivity by a process comprising contacting a saturated aliphatic discarboxylic acid of 4 to 12 carbon atoms, together with a saturated aliphatic glycol (an alkane diol) containing the same number of carbon atoms as the dicarboxylic acid in an amount 0.3 to 20 times (based on the weight) as great as the amount of said dicarboxylic acid, with hydrogen in the presence of a cobalt catalyst which has been sintered at 1000 to 1750° C. and then subjected to a reducing treatment, at a temperature within the range of from 180 to 300° C. and under a pressure to provide a hydrogen partial pressure of 10 to 80 kg./cm.², and this process has already been published in, for instance, German laid-open specification P 20 13 524.4 and the specification of French Pat. No. 2,039,822.

Research has been conducted on the above process and it has now been discovered that a catalyst having a novel composition can give a higher selectivity than the above-mentioned sintered and reduced cobalt catalyst and has a longer catalyst life than the above cobalt catalyst and can be prepared at lower temperatures than those adopted for the preparation of the above sintered and reduced catalyst. The reaction conditions adopted in the process of this invention are substantially the same as those disclosed in the above-noted German laid-open specification or French patent specification, except that such novel catalyst composition is used in the process of this invention.

This invention will now be described in more detail.

STARTING MATERIAL AND REAGENT

In the process of this invention, a saturated aliphatic dicarboxylic acid having 4 to 12 carbon atoms expressed by the following formula

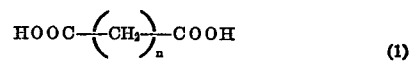

$$\mathrm{HOOC{-}(CH_2)_n{-}COOH} \tag{1}$$

wherein $n$ is a positive integer of from 2 to 10, is used as the starting material.

In accordance with this invention, one of such dicarboxylic acids is hydrogenated, together with a saturated aliphatic glycol having the same number of carbon atoms as the starting dicarboxylic acid in an amount 0.3 to 20 times (on the weight basis), preferably 0.5 to 5 times, as great as that of the starting dicarboxylic acid under conditions detailed hereinbelow. Such saturated aliphatic glycol is expressed by the following formula

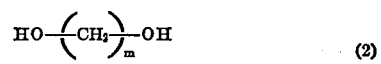

$$\mathrm{HO{-}(CH_2)_m{-}OH} \tag{2}$$

wherein $m$ is a positive integer of 4 to 12.

As a result of the above hydrogenation reaction, an ω-hydroxy saturated aliphatic monocarboxylic acid having the same number of carbon atoms as of the starting dicarboxylic acid is formed. In the instant specification, the term "corresponding" is used to indicate the starting dicarboxylic acid and resulting monocarboxylic acid having the same number of carbon atoms.

Combinations of starting dicarboxylic acids to be used in this invention, glycols to be added to the reaction system together with the starting acids and the resulting ω-hydroxyl monocarboxylic acids are illustrated in the following table.

mains in the catalyst composition in the state not converted to metallic cobalt, it may be converted to metallic cobalt during the reaction of this invention.

It is presumed that when the metal compound of the second component undergo the above reducing treatment, they take various forms depending on the specific type of metal compound employd. More specifically, some of them are reduced to metallic forms or are partially reduced, and others are not at all reduced and retain the original forms.

TABLE

| Number of carbon atoms | Starting material | Glycol to be added | Product |
| --- | --- | --- | --- |
| 4 | Succinic acid | 1,4-butanediol | 4-hydroxybutyric acid and/or γ-butyrolactone. |
| 5 | Glutaric acid | 1,5-pentanediol | 5-hydroxyvaleric acid. |
| 6 | Adipic acid | 1,6-hexanediol | 6-hydroxycaproic acid. |
| 7 | Pimelic acid | 1,7-heptanediol | 7-hydroxyheptanoic acid. |
| 8 | Suberic acid | 1,8-octanediol | 8-hydroxycaprylic acid. |
| 9 | Azelaic acid | 1,9-nonanediol | 9-hydroxyprlargonic acid. |
| 10 | Sebacic acid | 1,10-decanediol | 10-hydroxydecanoic acid. |
| 11 | 1,9-nonane-dicarboxylic acid | 1,11-undecanediol | 11-hydroxyundecanoic acid. |
| 12 | 1,10-decane-dicarboxylic acid | 1,12-dodecanediol | 12-hydroxylauric acid. |

CATALYST

In this invention a catalyst is used comprising the following two components:

(1) metallic cobalt derivated by reducing at least one cobalt compound (first component) selected from the group consisting of cobalt oxides, cobalt carbonates and cobalt hydroxides; and (2) a metal and/or metal compound derived by reducing at least one compound (second component) selected from the group consisting of phosphates, borates, molybdates and tungstates of iron, zinc and cobalt, oxides and hydroxides of iron, rhenium, zinc, phosphorus, boron, molybdenum and tungsten, and carbonates of iron and zinc.

Such catalysts are formed by reducing (1) at least one cobalt compound (first component) selected from the group consisting of cobalt oxides, cobalt carbonates and cobalt hydroxides and (2) at least one compound (second component) selected from the group consisting of phosphates, borates, molybdates and tungstates of iron, zinc and cobalt, oxides and hydroxides of iron, rhenium, zinc, phosphorus, boron, molybdenum and tungsten, and carbonates of iron and zinc, to thereby reduce at least a part of the cobalt compound of the first component to metallic cobalt. It is preferable to employ catalysts in which at least one metal selected from the group consisting of iron, rhenium, zinc, phosphorus, boron, molybdenum and tungsten or at least one compound of such metal contained in the second component or its reduced product is present in such amounts, calculated as metal, that the atomic ratio of (metal of second component)/(metallic cobalt derived from first component) is 0.01–10/100 (metallic cobalt), especially 0.1–4/100. As the second component, the above-mentioned iron compounds are preferably used.

It is preferable that the above reducing treatment is conducted at a temperature of from 200 to 600° C., especially from 250 to 500° C. in a hydrogen gas or a hydrogen-containing atmosphere. It is advantagous that such reducing treatment is performed until generation of water is not substantially observed. When the reducing treatment is carried out in a hydrogen gas or a hydrogen-containing atmosphere, the first component, namely at least one compound selected from cobalt oxides, cobalt carbonates and cobalt hydroxides is reduced relatively easily and converted to metallic cobalt. It is advantageous that as great a portion of the cobalt compound of the first component as possible is converted to metallic cobalt. However, as the process of this invention is carried out, as detailed hereinbelow, at a relatively high temperature of 180 to 300° C. in a hydrogen gas atmosphere, even if a part of the cobalt compound of the first component re- For instance, when rhenium oxide or hydroxide is used as the second component and is subjected to the above-mentioned reducing treatment together with the cobalt compound of the first component, at least a part, normally a greater portion, of the rhenium oxide or hydroxide is converted to metallic rhenium. Also when iron oxide, hydroxide or carbonate is used as the second component, at least a part of the iron compound is converted to metallic iron by the reducing treatment. In this case, it is presumed that at least a part of the remaining portion may retain the original oxide, hydroxide or carbonate form. In contrast, when, for example, a phosphate, borate, molybdate or tungstate of iron is employed as the second component, a majority of such iron compound is hardly reduced by the above-mentioned reducing treatment and such iron compound is believed to retain its original form. Further, most of the phosphates, borates, molybdates and tungstates of zinc and cobalt, oxides and hydroxides of zinc, phosphorus, boron, molybdenum and tungsten, and zinc carbonate are hardly reduced by the above-mentioned reducing treatment and it is presumed that they retain their original forms after the reducing treatment.

As described above, the second component of the catalyst to be used in this invention includes various compounds which are influenced by the above-mentioned reducing treatment in different manners depending on the kind of the metal compound and/or the reducing conditions; some of them being completely reduced and converted to the metallic form; some others being partially reduced while partially retaining their original form; and the rest being hardly reduced. However, in the catalyst of this invention, the degree of the reduction of the second component does not directly affect catalyst activity, and excellent catalytic effects such as illustrated hereinbelow can be attained by employing such second component conjointly with metallic cobalt derived from the first component.

It is also advantageous that the above reducing treatment is effected in such a manner that the cobalt compound of the first component and at least one metal compound as the second component are closely mixed with each other. To attain such mixed state of both the first and second components, the following exemplary methods may be adapted.

(A) A method comprising forming a mixed solution from a solution, preferably an aqueous solution, of a cobalt compound capable of forming the cobalt compound of the first component and a solution, preferably an aqueous solution, of the metal compound of the second component or a metal compound capable of forming the metal compound of the second component, adding to the mixed solution a suitable precipitant, for instance, an alkali or aqueous solution thereof, and thus coprecipitating the cobalt compound of the first component and the metal compounds of the second component (coprecipitating method).

(B) A method comprising impregnating the cobalt compound of the first component with a solution, for example, an aqueous solution, of a compound capable of forming the metal compound of the second component, adding thereto a suitable precipitant such as, for example, an alkali or aqueous solution thereof, and thus depositing the metal compound of the second component onto the cobalt compound of the first component (depositing method).

(C) A method comprising dipping the cobalt compound of the first component or a compound capable of forming the cobalt compound of the first component into a solution, preferably an aqueous solution, of the metal compound of the second component (dipping method).

(D) A method comprising mixing a powder of the cobalt compound of the first component with a powder of the metal compound of the second component as homogeneously as possible (mixing method).

Among these methods, the coprecipitating method (A) is especially advantageous. These methods will now be illustrated in more detail.

(A) Coprecipitating method

As "a compound capable of forming the cobalt compound of the first component" there may be mentioned, for example, inorganic acid salts of cobalt, such as the nitrate, sulfate and chloride, and organic acid salts such as the acetate, formate and oxalate. An alkali such as, for example, as ammonium carbonate, sodium carbonate, potassium carbonate, sodium hydroxide, potassium hydroxide and aqueous ammonia, or an aqueous solution of such alkali is added to a solution, preferably an aqueous solution, of such cobalt salt, whereby cobalt hydroxide or carbonate as the cobalt compound of the first component can readily be formed. When such hydroxide or carbonate of cobalt is sintered in an oxygen-containing atmosphere such as air at a suitable temperature ranging from 300 to 1600° C., preferably from 400 to 1000° C., an oxide of cobalt can readily be formed.

As "a metal compound capable of forming the metal compound of the second component," there may be mentioned salts of such inorganic and organic acids as mentioned with respect to the first component. A metal hydroxide or carbonate as the second component may readily be formed by adding to a solution, for example, an aqueous solution, of such inorganic or organic acid salt an alkali such as recited above or its aqueous solution. If desired, the resulting metal hydroxide or carbonate may be sintered under the same conditions as described above to obtain the metal compound of the second component in the form of an oxide. As the compound capable of forming the metal compound of the second component under such treatment, compounds where the metal is iron or zinc are preferably employed.

When an aqueous solution of an inorganic or organic acid salt of cobalt such as mentioned above is combined with an aqueous solution of a compound capable of forming the metal compound of the second group, especially an iron and/or zinc salt of such inorganic or organic acid as mentioned above and an alkaline substance such as recited above is added to the combined solution, the metal compound of the first component and the metal compound of the second component may be coprecipitated.

(B) Depositing method

"A solution of a metal compound capable of forming the metal compound of the second component" to be used in the depositing method, there may be mentioned solutions, preferably aqueous solutions, of metal compounds such as mentioned in the coprecipitating method, for example, inorganic or organic acid salts of iron or zinc. Various alkaline substances such as exemplified in the coprecipitating method may be used as a precipitant.

(C) Dipping method

As "a compound capable of forming the cobalt compound of the first component" to be used in the dipping method there may be also mentioned inorganic and organic acid salts of cobalt such as exemplified with respect to the coprecipitating method (A).

As the metal compound of the second component, preferably used, are for instance, rhenium oxide, rhenium hydroxide, and oxides and hydroxides of phosphorus, boron, molybdenum and tungsten. In general, these metal compounds to be used as the second component are readily soluble in water, and therefore, aqueous solutions of these compounds can easily be formed. When it is difficult to form aqueous solutions of such metal compounds merely by adding them to water, it is advantageous to employ ammonium or organic amine salts of these metals and dissolve them in water. Into the so formed aqueous solution of the metal compound of the second group the cobalt compound of the first component or a compound capable of forming the cobalt compound of the first component is dipped. The resulting cobalt compound impregnated with the aqueous solution of the metal compound of the second component is then dried, and reduced under the conditions such as described above. If desired, the sintering is effected in an oxygen-containing atmosphere under such conditions as described above prior to the reducing treatment.

When a carbonate of cobalt is used as the cobalt compound of the first component and a water-soluble compound of phosphorus, boron, molybdenum or tungsten as recited above is used as the metal compound of the second component, and when the cobalt carbonate is impregnated with a suitable amount of an aqueous solution of such second component, a cobalt carbonate containing a phosphate, borate, molybdate or tungstate of cobalt may be formed. Accordingly, the catalyst to be used in this invention is obtained by drying the formed cobalt carbonate as it is and reducing it. Also in this case, if desired, the sintering treatment may be effected in an oxygen-containing atmosphere prior to the reducing treatment.

(D) Mixing method

In the mixing method, a powder of the cobalt compound of the first component and a powder of the metal compound of the second component are mixed. It is advantageous that both powders are finely divided and they are mixed as homogeneously as possible.

For instance, a finely divided powder of a phosphate, borate, molybdate or tungstate of iron or zinc is mixed homogeneously with a finely divided powder of a cobalt compound of the first component, and when the resulting powdery mixture is reduced under such conditions as described above, a catalyst to be used in this invention is formed. Also in this case, if desired, the sintering treatment is effected in an oxygen-containing atmosphere prior to the reducing treatment.

FORM OF CATALYST

A closely combined mixture of a cobalt compound of the first component and a metal compound of the second component formed by the coprecipitating method (A), depositing method (B), dipping method (C) or mixing method (D) is dried and then subjected to the above-mentioned reducing treated as it is or after it has been sintered at 300 to 1600° C., preferably 400 to 1000° C., in an oxygen-containing atmosphere, if desired.

In this invention a supported catalyst may be used. The supported catalyst may be formed by incorporating a suitable carrier such as diatomaceous earth, pumice, silica gel, alumina, silica-alumina and other customary catalyst carriers into the system for preparing the above mixture by coprecipitating method (A), depositing method (B), dipping method (C) or mixing method (D) to support the mixture on such carrier, and sintering the supported mixture according to need and subjecting it to the reducing treatment.

It is also possible to mold the above mixture alone or supported on the carrier into pellets, tablets, rings, granules or plates. When the so molded mixture is reduced as it is or after it has been sintered according to need, a catalyst to be used in this invention is provided.

The use of a carrier and the preliminary molding are preferred in this invention. Especially, the preliminary molding gives a much preferred catalyst.

RATIO OF COBALT METAL OF FIRST COMPONENT AND METAL OF SECOND COMPONENT

In this invention the catalyst is prepared by the above-mentioned procedures. During the reducing treatment, at least a part of the cobalt compound of the first component is converted to metallic cobalt.

In the catalyst of this invention, it is important that at least one metal selected from the group consisting of iron, rhenium, zinc, phosphorus, boron, molybdenum and tungsten or at least one compound of such metal is present in the reduced product of the first and second components in such amounts, calculated as metal, that the atomic ratio ($k$) of (metal of the second component)/(metallic cobalt derived from the first component) is 0.01–10/100 (metallic cobalt), preferably 0.1–4/100. Especially preferred results are obtained when the above atomic ratio is 0.2–3/100.

When the amount, calculated as metal, of at least one metal selected from iron, rhenium, zinc, phosphorus, boron, molybdenum and tungsten or at least one compound of such metal, which is contained in reduced product, is less than the above-mentioned atomic ratio range, the effects attained by addition of the second component are poor. On the other hand, if the amount of such metal or metal compound in the reduced product is greater than the above-mentioned atomic ratio range, either the conversion of the starting saturated aliphatic dicarboxylic acid or the selectivity of the intended ω-hydroxy saturated aliphatic monocarboxylic acid is rather reduced in the reaction of this invention, which will be detailed hereinbelow. Therefore, it is not preferred to use the second component in too great an amount.

Surprisingly, it has now been found that when the above atomic ratio ($k$) of (metal of the second component)/(metallic cobalt derived from the first component) is adjusted within the above-mentioned specific range, various advantages such as mentioned below can be attained.

(1) The conversion of the starting aliphatic dicarboxylic acid can be increased.

(2) The selectivity of the intended ω-hydroxy saturated aliphatic monocarboxylic acid can be increased.

(3) As compared with the above-mentioned sintered and reduced cobalt catalyst, the catalyst of this invention can reduce the amounts of by-products, such as saturated aliphatic monohydric alcohols having the same number of carbon atoms as of the starting saturated dicarboxylic acid, saturated aliphatic monohydric alcohols having carbon atoms in a number less by 1–3 than the number of carbon atoms in the starting saturated dicarboxylic acid, and hydrogenolyzed products of the starting material or resulting reaction product, e.g., methane.

(4) In the case of the above-mentioned sintered and reduced cobalt catalyst, an effective catalyst cannot be formed unless the sintering is effected at as high temperatures as ranging from 1000 to 1750° C. In contrast, in the catalyst of this invention, such sintering step per se is not essential, and if the sintering is effected in an oxygen-containing atmosphere according to need, the sintering temperature is 300 to 1600° C. and better results are obtained at relatively low temperatures such as ranging from 400 to 1000° C.

(5) The life of the catalyst of this invention is much longer than the above-mentioned sintered and reduced cobalt catalyst.

REACTION CONDITIONS

According to this invention, a saturated aliphatic dicarboxylic acid having 4 to 12 carbon atoms and a glycol having the same number of carbon atoms in an amount (on the weight basis) of 0.3 to 20 times, preferably 0.5 to 5 times, as great as that of the saturated aliphatic dicarboxylic acid are contacted with hydrogen in the presence of the aforesaid catalyst at a temperature ranging from 180 to 300° C., preferably from 200 to 270° C. under such pressure that provides a hydrogen partial pressure ranging from 10 to 150 Kg./cm.$^2$, preferably from 20 to 100 kg./cm.$^2$.

In the process of this invention, if the amount of the glycol is less than 0.5 time, particularly less than 0.3 time, the starting dicarboxylic acid on the weight basis, the selectivity of the intended ω-hydroxy monocarboxylic acid is lowered, and formation of the corresponding glycol as a by-product is increased. On the other hand, if the amount of the glycol exceeds 5 times, particularly 20 times, the starting dicarboxylic acid on the weight basis, it is difficult to maintain the conversion of the starting dicarboxylic acid at a high level, and therefore, the yield of the corresponding ω-hydroxy monocarboxylic acid is reduced.

In the preparation of an ω-hydroxy monocarboxylic acid according to this invention, the reaction temperature and hydrogen partial pressure within the reaction system are also important factors. At reaction temperatures below 200° C., particularly below 180° C., the conversion of the starting dicarboxylic acid is lowered, and if the reaction temperature exceeds 270° C., particularly 300° C., side reactions such as hydrogenolysis are promoted. Consequently, formation of side products such as monohdyric alcohols containing the same number of carbon atoms as the intended ω-hydroxy monocarboxylic acid or a lesser number of carbon atoms than the intended ω-hydroxy monocarboxylic acid is increased, and as a result, the selectivity of the intended product is lowered.

Again, when the partial pressure of hydrogen in the reaction system at the reaction temperature within the above-mentioned range is below 20 kg./cm.$^2$, particularly below 10 kg./cm.$^2$, the conversion of the starting dicarboxylic acid is lowered. If the hydrogen partial pressure exceeds 100 kg./cm.$^2$, particularly 150 kg./cm.$^2$, the selectivity of the intended ω-hydroxy monocarboxylic acid is lowered and formation of the corresponding glycol as a by-product is increased.

In this invention, it is preferred that the hydrogen partial pressure in the reaction system is higher within the above-mentioned range at the first half stage of the reaction and is maintained at a lower level within the above-mentioned range at the second half stage of the reaction. It is especially preferred that the hydrogen partial pressure (P1) at the first half stage of the reaction is maintained within a range expressed by the following formula $$80 \text{ kg./cm.}^2 \leqq P1 \leqq 150 \text{ kg./cm.}^2 \quad (1)$$

and that the partial pressure (P2) of hydrogen at the second half stage of the reaction is maintained within a range expressed by the following formula $$10 \text{ kg./cm.}^2 \leqq P2 \leqq 80 \text{ kg./cm.}^2 \quad (2)$$

Such adjustment of the hydrogen partial pressure at the first half stage of the reaction and at the second half stage, especially the latter ⅓ stage of the reaction, may be accomplished by lowering the hydrogen partial pressure either continuously or stepwise.

By conducting such adjustment of the hydrogen partial pressure, it is possible to increase the yield of the intended ω-hydroxy monocarboxylic acid per unit hour per unit weight of the catalyst.

Furthermore, the conversion of the starting dicarboxylic acid can be improved by making water present in the above-mentioned reaction system in an amount not exceeding 10 molar times, particularly ranging from 0.5 to 3 molar times, the starting dicarboxylic acid. When water is made present in an amount of 10 moles or more per mole of the starting dicarboxylic acid, the conversion of the dicarboxylic acid may be further improved, but the selectivity of the intended ω-hdyroxy monocarboxylic acid is abruptly lowered. Therefore, the presence of water in too great an amount is not preferred in this invention.

In this invention, the life of the catalyst is frequently extremely prolonged and good results are obtained, if a cobalt compound soluble in the reaction mixture and capable of being reduced under the reaction conditions of this invention and/or the same metal compound as the metal compound constituting the second component of the catalyst is present in the reaction mixture in a small amount and the hydrogenation is carried out under the above-mentioned reaction conditions.

It is preferred that such cobalt compound and/or the same metal compound constituting the second component of the catalyst is present in the reaction mixture at such a concentration, calculated as metal, ranging from 0.001 to 1% by weight, preferably 0.01 to 0.5% by weight, based on the total reaction mixture.

The reason why the life of the catalyst of this invention can be prolonged by addition of such compound has not been completely elucidated, but it is presumed that the cobalt compound which is added is reduced with hydrogen under the reaction conditions of this invention and the resulting metallic cobalt may coat the catalyst surface to prevent the deactivation of the catalyst by corrosion, and that the same compound as the metal compound constituting the second component of the catalyst, when added to the reaction mixture, is reduced or not reduced under the reaction conditions of this invention and supplies the second component for the catalyst while compensating for the consumption or shortage of the second component during the reaction.

It is noted that it is sufficient that the above-mentioned atomic ratio ($k$) of (metal of the second component)/(metallic cobalt derived from the first component) is maintained within the above-mentioned range under the reaction conditions of this invention, and it is not always necessary that a catalyst prepared in advance have the above atomic ratio ($k$) within the above-mentioned range.

According to this invention, it is possible to convert the saturated aliphatic dicarboxylic acid charged into the reaction system as the starting material at a high conversion and with a high selectivity to the corresponding aliphatic ω-hydroxy monocarboxylic acid without greatly reducing the amount of the aliphatic glycol (alkane diol) initially added to the reaction system. In a preferable embodiment of this invention the amount of the glycol is maintained at an almost constant level. When the reaction of this invention is carried out under the above conditions, a part of the ω-hydroxy monocarboxylic acid formed by the hydrogenation of the starting dicarboxylic acid is further hydrogenated to the corresponding diol. Under the reaction conditions of this invention, however, a part of the so formed diol is converted to the ω-hydroxy carboxylic acid by the dehydrogenation of the diol. Thus, both reactions, namely formation of the ω-hydroxy carboxylic acid from the diol and formation of the diol from the ω-hydroxy carboxylic acid to advance with the balance being kept therebetween. In such state, the reaction of forming the ω-hydroxy carboxylic acid from the starting dicarboxylic acid is allowed to advance very smoothly. This is the reason why high conversion of the starting dicarboxylic acid and high selectivity of the intended ω-hydroxy monocarboxylic acid can be obtained in the process of this invention.

Thus, according to this invention, it is possible to use as the starting substance not only an aliphatic saturated dicarboxylic acid such as adipic acid in a pure form but also an adipic acid-containing oxidation product formed by oxidizing cyclohexane with molecular oxygen according to a known method such as disclosed in, for example, the specification of British Pat. No. 935,029. Also an adipic acid-containing extract obtained by extracting the above oxidation product with water and/or 1,6-hexanediol may be similarly used. Apparently, if 1,6-hexanediol is used as the extracting agent, the amount of the diol contained in the extract should be adjusted to 0.3 to 20 times, preferably 0.5 to 5 times, the amount of adipic acid (on the weight basis) before the hydrogenation of the extract is effected according to the process of this invention. In the manner described above, ε-hydroxycaproic acid may be prepared from cyclohexanone by a two-stage process with high selectivity according to this invention.

Incidentally, a part of ε-hydroxycaproic acid obtained according to this invention takes the form of an oligomer thereof and/or 1,6-hexanediol ester of ε-hydroxycaproic acid or its oligomer. The same applies to other ω-hydroxy monocarboxylic acids formed according to the process of this invention.

Various methods are available for separation and recovery of the resulting ω-hydroxy monocarboxylic acids. For example, an alkali such as sodium hydroxide and potassium hydroxide may be added to the resulting reaction product to hydrolyze an oligomer of ω-hydroxy monocarboxylic acid, and an ester of ω-hydroxy monocarboxylic acid and its oligomer. Then, the saturated aliphatic glycol is removed from the hydrolyzed liquid by distillation or extraction, and ω-hydroxy monocarboxylic acid can be separated from the resulting aqueous solution by adding a mineral acid such as hydrochloric acid or sulfuric acid to the aqueous solution, selectively extracting ω-hydroxy monocarboxylic acid therefrom with use of an extracting agent such as cyclohexanol and removing the extracting agent from the extract, as proposed in the specification of British Pat. No. 1,078,385.

Particularly, for separating ε-hydroxycaproic acid from the reaction product obtained by hydrogenation of adipic acid according to this invention, a process comprising removing low boiling substances such as water from the reaction product and heating the residue at temperatures ranging from 180 to 340° C. under reduced pressures ranging from 0.1 to 300 mm. Hg may be preferably used. By adopting such process, it is possible to effectively recover ε-hydroxycaproic acid in the form of ε-caprolactone with great ease.

The liquor left after isolation and recovery of ε-hydroxycaproic acid by such procedures comprises unreacted adipic acid, a majority of which takes the form of an ester with 1,6-hexanediol or its oligomer. When such ester and oligomer are applied again to the process of this invention, they may be converted to ε-hydroxycaproic acid.

The catalyst of this invention may be used for the reaction in any form, i.e. fixed bed, the fluidized bed, or moving bed.

The process of this invention can be performed either batchwise or continuously, and the starting material mixture may be contacted with hydrogen in either a countercurrent or co-current manner.

This invention will now be illustrated in more detail by reference to the examples, but it must be noted that these examples do not at all limit the scope of this invention.

In the examples and comparative examples given hereinbelow, the values of the conversion of adipic acid, the selectivity of ε-hydroxycaproic acid and the ratio of formation of side products are those calculated according to the following formulae:

Conversion of Adipic Acid (Percent)

$$= \frac{\text{Adipic Acid Fep (mole)} - \text{Unreacted Adipic Acid (mole)}}{\text{Adipic Acid Fed (mole)}} \times 100$$

Selectivity of ε-Hydroxycaproic Acid (percent)

$$= \frac{\text{ε-Hydroxycaproic Acid Formed (mole)}}{[\text{Adipic Acid Fed (mole)} - \text{Unreacted Adipic Acid (mole)}] + [1,6\text{-Hexanediol Fed (mole)} - \text{Remaining 1,6-Hexanediol (mole)}]} \times 100$$

Ratio of Formation of Side Products (Percent)

$$= \frac{\text{Pentanol (mole)} + \text{Hexanol (mole)}}{\text{ε-Hydroxycaproic Acid Formed (mole)} + \text{Pentanol (mole)} + \text{Hexanol (mole)}} \times 100$$

autoclave under a pressure of 70 kg./cm.² G. The reaction was carried out at 220° C. for 3 hours. As a result of the analysis of the resulting reaction product, it was found that the reaction product comprised 0.086 mole of adipic acid, 0.218 mole of ε-hydroxycaproic acid, 0.570 mole of 1,6-hexanediol, and as side products, 0.003 mole of n-pentanol and 0.007 mole of n-hexanol. Thus, the conversion of adipic acid was 70.0%, the selectivity of ε-hydroxycaproic acid was 96.7% and the ratio of formation of side products was 4.4%.

EXAMPLES 2–8

With use of the catalyst prepared in Example 1(a), the reaction of Example 1 was conducted batchwise 50 times under the same conditions as in Example 1. The catalyst was used repeatedly throughout 50 runs. Results of the analysis of reaction mixtures recovered from the 5th, 10th, 15th, 20th, 30th, 40th, and 50th batches are shown in Table 1.

TABLE 1

| Example number | 2 | 3 | 4 | 5 | 6 | 7 | 8 |
|---|---|---|---|---|---|---|---|
| Batch number | 5 | 10 | 15 | 20 | 30 | 40 | 50 |
| Feed composition: | | | | | | | |
| AA fed (g.) | 42 | 42 | 42 | 42 | 42 | 42 | 42 |
| HDO fed (g.) | 70 | 70 | 70 | 70 | 70 | 70 | 70 |
| Water fed (g.) | 7 | 7 | 7 | 7 | 7 | 7 | 7 |
| Reaction conditions: | | | | | | | |
| H₂ feed pressure (kg./cm.² g.) | 70 | 70 | 70 | 70 | 70 | 70 | 70 |
| Reaction temperature (° C.) | 220 | 220 | 220 | 220 | 220 | 220 | 220 |
| Reaction time (hours) | 3 | 3 | 3 | 3 | 3 | 3 | 3 |
| Analysis results: | | | | | | | |
| AA (mole) | 0.085 | 0.091 | 0.083 | 0.099 | 0.100 | 0.101 | 0.105 |
| HCA (mole) | 0.229 | 0.231 | 0.202 | 0.200 | 0.186 | 0.179 | 0.165 |
| HDO (mole) | 0.552 | 0.541 | 0.560 | 0.600 | 0.582 | 0.607 | 0.598 |
| AA conversion (percent) | 70.4 | 68.4 | 71.3 | 65.5 | 65.2 | 64.8 | 63.4 |
| HCA selectivity (percent) | 94.0 | 92.7 | 85.0 | 106.1 | 93.7 | 103.2 | 93.2 |
| Ratio of formation of side products (percent) | 5.6 | 6.7 | 6.1 | 3.8 | 4.8 | 4.0 | 4.5 |

"Adipic acid" and "ε-hydroxycaproic acid" are abbreviated as "AA" and "HCA," respectively, in the tables given in the examples. Further, "1,6-hexanediol" is abbreviated as "HDO" in the tables.

EXAMPLE 1

(a) Preparation of catalyst

A solution of 300 g. of cobalt nitrate

[Co(NO₃)₂·6H₂O]

and 4.4 g. of ferric nitrate [Fe(NO₃)₃·9H₂O] dissolved in 1 liter of water was added dropwise to a solution of 180 g. of ammonium carbonate dissolved in 2 liters of water at room temperature under violent agitation. The resulting mixture was allowed to stand overnight, and the resulting precipitate was washed sufficiently with water, filtered and dried at 90–110° C. In a stainless steel vessel, the resulting powder was thermally decomposed with care under agitation, molded into pellets having a diameter of 5 mm. and a length of 2 mm., and sintered at 600° C. for 4 hours. The resulting pelletized and sintered product was reduced at 330° C. in a hydrogen current until generation of water was not substantially observed.

(b) Synthesis of ε-hydroxycaproic acid

A stainless steel autoclave of the vertical agitation type having an inner capacity of 300 cc. was charged with 42 g. (0.288 mole) of adipic acid, 70 g. (0.593 mole) of 1,6-hexanediol, 7 g. of water and 55 g. of the catalyst obtained in (a) above, and hydrogen gas was fed into the

COMPARATIVE EXAMPLES 1–5

An iron-free reduced cobalt catalyst was prepared in the same manner as in Example 1(a) except that ferric nitrate was not employed. In the same manner as in Example 1(b) the starting materials were charged and the reaction was carried out under the same conditions as in Example 1(b) with use of the so-prepared iron-free reduced cobalt catalyst. The reaction was repeated 10 times batchwise, and the catalyst was used repeatedly throughout 10 runs. Results of the analysis of the so-formed reaction products are shown in Table 2.

As is seen from the results shown in Table 2, both the conversion of adipic acid and the selectivity of ε-hydroxycaproic acid were lowered in these comparative examples as compared with Examples 2–8. It is also seen that in these comparative examples the repeated use of the catalyst resulted in abrupt reduction of the conversion of adipic acid.

TABLE 2

| Comparative example number | 1 | 2 | 3 | 4 | 5 |
|---|---|---|---|---|---|
| Amount (g.) of catalyst | 65 | 65 | 65 | 65 | 65 |
| Batch number | 1 | 3 | 5 | 7 | 10 |
| Feed composition: | | | | | |
| AA fed (g.) | 42 | 42 | 42 | 42 | 42 |
| HDO fed (g.) | 70 | 70 | 70 | 70 | 70 |
| Water fed (g.) | 7 | 7 | 7 | 7 | 7 |
| Reaction conditions: | | | | | |
| H₂ feed pressure (kg./cm.² g.) | 70 | 70 | 70 | 70 | 70 |
| Reaction temperature (° C.) | 220 | 200 | 220 | 220 | 220 |
| Reaction time (hours) | 3 | 3 | 3 | 3 | 3 |
| Analysis results: | | | | | |
| AA (mole) | 0.107 | 0.124 | 0.147 | 0.180 | 0.202 |
| HCA (mole) | 0.142 | 0.132 | 0.110 | 0.090 | 0.070 |
| HDO (mole) | 0.562 | 0.592 | 0.593 | 0.600 | 0.583 |
| AA conversion (percent) | 62.8 | 57.1 | 48.9 | 37.5 | 29.9 |
| HCA selectivity (percent) | 67.1 | 69.9 | 77.7 | 88.7 | 73.0 |

EXAMPLES 9–15

A catalyst was prepared in the same manner as in Example 1(a) except that the sintering temperature, the sintering time and the reducing temperature were changed as indicated in Table 3. In the same manner as in Example 1(b) the starting materials were fed, and the reaction was carried out under the same conditions as in Example 1(b). Results are shown in Table 3.

Comparative Examples 11–14

A copper-containing reduced cobalt catalyst was prepared in the same manner as in example 1(a) except that 2.2 g. of cupric nitrate [$Cu(NO_3)_2 \cdot 3H_2O$] were used in-

TABLE 3

| Example number | 9 | 10 | 11 | 12 | 13 | 14 | 15 |
|---|---|---|---|---|---|---|---|
| Sintering temperature (° C.) | 400 | 800 | 1,100 | 1,400 | 600 | 600 | 600 |
| Sintering time (hours) | 4 | 3 | 1 | 1 | 4 | 4 | 4 |
| Reducing temperature (° C.) | 330 | 330 | 330 | 330 | 250 | 380 | 450 |
| Feed composition: | | | | | | | |
| AA fed (g.) | 42 | 42 | 42 | 42 | 42 | 42 | 42 |
| HDO fed (g.) | 70 | 70 | 70 | 70 | 70 | 70 | 70 |
| Water fed (g.) | 7 | 7 | 7 | 7 | 7 | 7 | 7 |
| Reaction conditions: | | | | | | | |
| $H_2$ feed pressure (kg./cm.$^2$ g.) | 70 | 70 | 70 | 70 | 70 | 70 | 70 |
| Reaction temperature (° C.) | 220 | 220 | 220 | 220 | 220 | 220 | 220 |
| Reaction time (hours) | 3 | 3 | 3 | 3 | 3 | 3 | 3 |
| Analysis results: | | | | | | | |
| AA (mole) | 0.108 | 0.090 | 0.087 | 0.070 | 0.104 | 0.101 | 0.098 |
| HCA (mole) | 0.162 | 0.204 | 0.193 | 0.220 | 0.165 | 0.187 | 0.177 |
| HDO (mole) | 0.616 | 0.558 | 0.561 | 0.512 | 0.593 | 0.574 | 0.574 |
| AA conversion (percent) | 62.3 | 68.9 | 69.7 | 75.8 | 64.0 | 64.9 | 65.8 |
| HCA selectivity (percent) | 103.2 | 87.6 | 82.6 | 73.2 | 89.7 | 90.8 | 85.0 |
| Ratio of formation of side products (percent) | 5.0 | 7.6 | 8.8 | 11.3 | 6.6 | 5.5 | 7.1 |

Comparative Examples 6–10

With use of the catalysts described below, the reaction was carried out under the same conditions as in Example 1(b). Results of the analysis of the obtained reaction mixtures are indicated in Table 4.

Catalyst used in Comparative Example 6.—Example 1(a) was repeated without employing ferric nitrate. The precipitate of basic cobalt carbonate derived from cobalt nitrate and ammonium carbonate was filtered and dried, and 200 g. of the resulting powder were mixed in a ball mill with 1.6 g. of tri-iron tetroxide for 2 hours. The blend was carefully thermally decomposed by preliminary sintering, molded into pellets having a diameter of 5 mm. and a length of 2 mm., sintered at 600° C. for 4 hours, and reduced at 330° C. in a hydrogen current until generation of water was not observed.

Catalysts used in Comparative Examples 6–10.—Cobalt oxide was pressure-molded into pellets having a diameter of 5 mm. and a length of 2 mm., heated at 600° C. for 4 hours (Comparative Example 6), at 1100° C. for 1 hour (Comparative Examples 7 and 8), or at 1400° C. for 1 hour (Comparative Examples 9 and 10), and then reduced at 330° C. Either in Comparative Examples 7 and 8, or in Comparative Examples 9 and 10, the same catalysts were used repeatedly. The difference in the comparative example number indicates the difference in batch number as shown in Table 4.

TABLE 4

| Comparative example number | 6 | 7 | 8 | 9 | 10 |
|---|---|---|---|---|---|
| Amount (g.) of catalyst | 70 | 70 | 70 | 70 | 70 |
| Batch number | 1 | 2 | 15 | 2 | 15 |
| Feed composition: | | | | | |
| AA fed (g.) | 42 | 42 | 42 | 42 | 42 |
| HDO fed (g.) | 70 | 70 | 70 | 70 | 70 |
| Water fed (g.) | 7 | 7 | 7 | 7 | 7 |
| Reaction conditions: | | | | | |
| $H_2$ feed pressure (kg./cm.$^2$ g.) | 70 | 70 | 70 | 70 | 70 |
| Reaction temperature (° C.) | 220 | 220 | 220 | 220 | 220 |
| Reaction time (hours) | 3 | 3 | 3 | 3 | 3 |
| Analysis results: | | | | | |
| AA (mole) | 0.214 | 0.099 | 0.130 | 0.092 | 0.116 |
| HCA (mole) | 0.063 | 0.245 | 0.132 | 0.174 | 0.132 |
| HDO (mole) | 0.588 | 0.500 | 0.587 | 0.559 | 0.557 |
| AA conversion (percent) | 25.5 | 65.4 | 54.8 | 68.1 | 59.5 |
| HCA selectivity (g.) | 80.6 | 86.8 | 80.9 | 75.6 | 63.7 |
| Ratio of formation of side products (percent) | 8.9 | 10.1 | 12.0 | 18.7 | 21.1 | stead of ferric nitrate. In the same manner as in Example 1(b) the starting materials and the so formed catalyst were charged in the autoclave and the reaction was carried out under the same conditions as in Example 1(b). The reaction was conducted 15 times batchwise, and the catalyst was used repeatedly throughout 15 runs. Results of the analysis of the so formed reaction products are shown in Table 5.

As is seen from the results shown in Table 5, in these comparative examples the repeated use of the catalyst resulted in rapid reduction of the conversion of adipic acid as compared with Examples 2–8.

Comparative Examples 15–17

With use of reduced cobalt catalysts containing copper and/or chromium, prepared by the methods described below, the reaction was carried out under the same conditions as in Example 1(b). Results of the analysis of the obtained reaction mixtures are also shown in Table 5.

Catalyst used in Comparative Example 15.—An aqueous solution containing 291 g. of cobalt nitrate and 24 g. of copper nitrate was added dropwise to an aqueous solution containing 200 g. of ammonium carbonate under violent agitation. The mixture was allowed to stand overnight, and the resulting precipitate was filtered, dried, impregnated with an aqueous solution containing 10 g. of ammonium dichromate, dried again, sintered preliminarily, molded into pellets, sintered at 500° C. for 3 hours and then reduced at 330° C.

Catalyst used in Comparative Example 16.—An aqueous solution containing 470 g. of cobalt nitrate and 39 g. of chromium nitrate was added dropwise to an aqueous solution containing 500 g. of sodium carbonate, and the resulting precipitate was washed, filtered, dried, sintered preliminarily, molded into pellets, sintered at 1400° C. for 1 hour and reduced at 330° C.

Catalyst used in Comparative Example 17.—An aqueous solution containing 600 g. of cobalt nitrate and 14.5 g. of copper nitrate was added dropwise to an aqueous solution containing 500 g. of sodium carbonate; and the resulting precipitate was washed, filtered, dried, sintered preliminarily, molded into pellets, sintered at 1100° C. for 1 hour, and then reduced at 330° C.

was carried out batchwise in the same manner as described above. (Examples 26 and 27.)

TABLE 5

| Comparative Example number | 11 | 12 | 13 | 14 | 15 | 16 | 17 |
|---|---|---|---|---|---|---|---|
| Amount (g.) of catalyst | 65 | 65 | 65 | 65 | 70 | 70 | 70 |
| Batch number | 2 | 5 | 10 | 15 | 1 | 1 | 1 |
| Feed composition: | | | | | | | |
| AA fed (g.) | 42 | 42 | 42 | 42 | 42 | 42 | 42 |
| HDO fed (g.) | 70 | 70 | 70 | 70 | 70 | 70 | 70 |
| Water fed (g.) | 7 | 7 | 7 | 7 | 7 | 7 | 7 |
| Reaction conditions: | | | | | | | |
| $H_2$ feed pressure (kg./cm.$^2$ g.) | 70 | 70 | 70 | 70 | 70 | 70 | 70 |
| Reaction temperature (° C.) | 220 | 220 | 220 | 220 | 220 | 220 | 220 |
| Reaction time (hours) | 3 | 3 | 3 | 3 | 3 | 3 | 3 |
| Analysis results: | | | | | | | |
| AA (mole) | 0.118 | 0.134 | 0.153 | 0.178 | 0.212 | 0.240 | 0.241 |
| HCA (mole) | 0.162 | 0.159 | 0.142 | 0.089 | 0.076 | 0.042 | 0.009 |
| HDO (mole) | 0.577 | 0.567 | 0.583 | 0.603 | 0.562 | 0.513 | 0.579 |
| AA conversion (g.) | 58.8 | 53.5 | 46.8 | 38.3 | 26.5 | 16.7 | 16.3 |
| HCA selectivity (percent) | 87.1 | 88.3 | 97.9 | 89.1 | 71.0 | 32.8 | 14.8 |

EXAMPLES 16–23

Catalysts were prepared in the same manner as in Example 1(a) except that the amount of ferric nitrate was changed to 0.3 g. (Examples 16 and 17), 0.5 g. (Examples 18 and 19), 8.8 g. (Examples 20 and 21), 22.0 g. (Example 22) or 44 g. (Example 23). In the same manner as in Example 1(b) the starting materials and 60 g. of the resulting catalyst were charged, and the reaction was carried out under the same conditions as in Example 1(b). Results of the analysis of the obtained reaction mixtures are shown in Table 6. In Examples 16 and 17, in Examples 18 and 19 or in Examples 20 and 21, the difference of the Example number indicates the difference of the run number (batch number). In these Examples, the reaction was carried out batchwise and the catalyst was used repeatedly throughout all the runs. Results of the reaction conducted at the Fe/Co atomic ratio of 1.0 are illustrated in preceding Examples 1–8.

Results of the analysis of the so formed reaction mixtures are shown in Table 7.

TABLE 7

| Example number | 24 | 25 | 26 | 27 |
|---|---|---|---|---|
| Amount (g.) of catalyst | 48 | 48 | 50 | 50 |
| Batch number | 2 | 10 | 2 | 10 |
| Feed composition: | | | | |
| AA fed (g.) | 42 | 42 | 42 | 42 |
| HDO fed (g.) | 70 | 70 | 70 | 70 |
| Water fed (g.) | 7 | 7 | 7 | 7 |
| Reaction conditions: | | | | |
| $H_2$ feed pressure (kg./cm.$^2$ g.) | 70 | 70 | 70 | 70 |
| Reaction temperature (° C.) | 220 | 220 | 220 | 220 |
| Reaction time (hours) | 3 | 3 | 3 | 3 |
| Analysis results: | | | | |
| AA (mole) | 0.090 | 0.098 | 0.090 | 0.110 |
| HCA (mole) | 0.203 | 0.208 | 0.153 | 0.158 |
| HDO (mole) | 0.518 | 0.572 | 0.562 | 0.600 |
| AA conversion (percent) | 68.7 | 66.1 | 68.7 | 61.8 |
| HCA selectivity (percent) | 74.5 | 78.3 | 66.8 | 92.4 |
| Ratio of formation of side products (percent) | | 7.2 | | 5.4 |

TABLE 6

| Example number | 16 | 17 | 18 | 19 | 20 | 21 | 22 | 23 |
|---|---|---|---|---|---|---|---|---|
| Fe/Co atomic ratio (percent) | 0.05 | 0.05 | 0.1 | 0.1 | 2.0 | 2.0 | 5.0 | 10.0 |
| Batch number | 2 | 10 | 2 | 10 | 2 | 15 | 2 | 2 |
| Feed composition: | | | | | | | | |
| AA fed (g.) | 42 | 42 | 42 | 42 | 42 | 42 | 42 | 42 |
| HDO fed (g.) | 70 | 70 | 70 | 70 | 70 | 70 | 70 | 70 |
| Water fed (g.) | 7 | 7 | 7 | 7 | 7 | 7 | 7 | 7 |
| Reaction conditions: | | | | | | | | |
| $H_2$ feed pressure (kg./cm.$^2$ g.) | 70 | 70 | 70 | 70 | 70 | 70 | 70 | 70 |
| Reaction temperature (° C.) | 220 | 220 | 220 | 220 | 220 | 220 | 220 | 220 |
| Reaction time (hours) | 3 | 3 | 3 | 3 | 3 | 3 | 3 | 3 |
| Analysis results: | | | | | | | | |
| AA (mole) | 0.107 | 0.154 | 0.080 | 0.100 | 0.090 | 0.106 | 0.157 | 0.178 |
| HCA (mole) | 0.143 | 0.111 | 0.261 | 0.173 | 0.258 | 0.144 | 0.095 | 0.088 |
| HDO (mole) | 0.610 | 0.611 | 0.432 | 0.583 | 0.453 | 0.602 | 0.546 | 0.510 |
| AA conversion (percent) | 62.7 | 46.4 | 72.1 | 65.3 | 68.7 | 63.2 | 45.5 | 38.3 |
| HCA selectivity (percent) | 87.9 | 96.4 | 70.7 | 87.4 | 76.3 | 83.2 | 53.4 | 45.6 |

EXAMPLES 24–27

An aqueous solution containing 300 g. of cobalt nitrate and 4.4 g. of ferric nitrate was added dropwise to an aqueous solution containing 180 g. of ammonium carbonate under violent agitation, and the mixture was allowed to stand overnight. The resulting precipitate was washed, filtered, dried and ground. Ground particles having a size of 7–12 mesh were collected and reduced in a hydrogen current at 250° C. for 1 hour, at 330° C. for another hour and at 450° C. for still another hour. The so formed catalyst and starting materials were charged in the autoclave in the same manner as in Example 1(b), and the reaction was carried out batchwise 10 times under the same conditions as in Example 1(b). The catalyst was used repeatedly throughout 10 runs. (Examples 24 and 25.)

A catalyst was prepared in the same manner as described above except that 120 g. of sodium hydroxide were employed instead of 180 g. of ammonium carbonate, and with use of the so prepared catalyst the reaction

EXAMPLES 28–33

Examples 28 and 29: Dried powder of basic cobalt carbonate obtained in Comparative Example 1 by adding an aqueous solution containing 300 g. of cobalt nitrate dropwise to an aqueous solution containing 180 g. of ammonium carbonate was blended with 0.8 g. of ferric phosphate in a ball mill. The resulting blend was molded into pellets and reduced at 330° C. without sintering to obtain a catalyst. With use of the so formed catalyst, the reaction was carried out batchwise 5 times under the same conditions as in Example 1(b).

EXAMPLE 30

A catalyst was prepared in the same manner as in Example 28 except that 0.7 g. of ferric borate was used instead of ferric phosphate. The reaction was carried out batchwise under the same conditions as in Example 1(b) with use of the so prepared catalyst.

EXAMPLE 31

A catalyst was prepared in the same manner as in Example 28 except that 2.0 g. of ferric molybdate were used instead of 0.8 g. of ferric phosphate. With use of the so prepared catalyst, the reaction was carried out batchwise under the same conditions as in Example 1(b).

EXAMPLE 32

A catalyst was prepared in the same manner as in Example 28 except that 2.5 g. of ferric tungstate were used instead of 0.8 g. of ferric phosphate. With use of the so prepared catalyst, the reaction was carried out batchwise under the same conditions as in Example 1(b).

EXAMPLE 33

A catalyst was prepared in the same manner as in Example 28 except that 0.9 g. of titanium phosphate was employed instead of 0.8 g. of ferric phosphate. With use of the so prepared catalyst, the reaction was carried out batchwise under the same conditions as in Example 1(b).

Results of the analysis of the reaction mixtures formed in the above examples are shown in Table 8.

EXAMPLES 39 and 40

Dried powder of basic cobalt carbonate obtained in Comparative Example 1 by adding an aqueous solution containing 300 g. of cobalt nitrate dropwise to an aqueous solution containing 180 g. of ammonium carbonate was blended with 2.5 g. of zinc phosphate in a ball mill. The blend was sintered preliminarily, molded into pellets, sintered at 600° C. for 4 hours and reduced at 330° C. to obtain a catalyst. With use of the so prepared catalyst, the reaction was carried out batchwise 5 times under the same conditions as in Example 1(b). The catalyst was repeatedely used throughout 5 runs.

EXAMPLE 41

A catalyst was prepared in the same manner as in Example 28 except that 2.5 g. of zinc phosphate were employed instead of 0.8 g. of ferric phosphate. With use of the so formed catalyst, the reaction was carried out batchwise under the same conditions as in Example 1(b).

TABLE 8

| Example number | 28 | 29 | 30 | 31 | 32 | 33 |
|---|---|---|---|---|---|---|
| Amount (g.) of catalyst | 55 | 55 | 60 | 60 | 60 | 60 |
| Batch number | 2 | 5 | 2 | 2 | 2 | 2 |
| Feed composition: | | | | | | |
| AA fed (g.) | 42 | 42 | 42 | 42 | 42 | 42 |
| HDO fed (g.) | 70 | 70 | 70 | 70 | 70 | 70 |
| Water fed (g.) | 7 | 7 | 7 | 7 | 7 | 7 |
| Reaction conditions: | | | | | | |
| $H_2$ feed pressure (kg./cm.$^2$ g.) | 70 | 70 | 70 | 70 | 70 | 70 |
| Reaction temperature (° C.) | 220 | 220 | 220 | 220 | 220 | 220 |
| Reaction time (hours) | 3 | 3 | 3 | 3 | 3 | 3 |
| Analysis results: | | | | | | |
| AA (mole) | 0.087 | 0.090 | 0.098 | 0.091 | 0.101 | 0.150 |
| HCA (mole) | 0.198 | 0.189 | 0.195 | 0.226 | 0.197 | 0.129 |
| HDO (mole) | 0.549 | 0.588 | 0.570 | 0.531 | 0.564 | 0.582 |
| AA conversion (percent) | 69.8 | 68.8 | 66.0 | 68.4 | 64.9 | 47.9 |
| HCA selectivity (percent) | 80.8 | 93.1 | 91.5 | 85.6 | 91.2 | 86.6 |

EXAMPLES 34–38

Examples 34–36: A catalyst was prepared in the same manner as in Example 1(a) except that 2.8 g. of zinc sulfate were used instead of 4.4 g. of ferric nitrate, and with use of the so prepared catalyst, the reaction was carried out batchwise 20 times under the same conditions as in Example 1(b). The catalyst was used repeatedly throughout 20 runs.

Examples 37–38: A catalyst was prepared in the same manner as in Example 24 except that 2.8 g. of zinc sulfate were employed instead of 4.4 g. of ferric nitrate, and with use of the so prepared catalyst, the reaction was carried out batchwise 12 times under the same conditions as in Example 1(b). The catalyst was used repeatedly throughout 12 runs.

Results of the analysis of the reaction mixtures obtained in the above examples are shown in Table 9.

TABLE 9

| Example number | 34 | 35 | 36 | 37 | 38 |
|---|---|---|---|---|---|
| Amount (g.) of catalyst | 70 | 70 | 70 | 60 | 60 |
| Batch number | 2 | 10 | 20 | 2 | 12 |
| Feed composition: | | | | | |
| AA fed (g.) | 42 | 42 | 42 | 42 | 42 |
| HDO fed (g.) | 70 | 70 | 70 | 70 | 70 |
| Water fed (g.) | 7 | 7 | 7 | 7 | 7 |
| Reaction conditions: | | | | | |
| $H_2$ feed pressure (kg./cm.$^2$ g.) | 70 | 70 | 70 | 70 | 70 |
| Reaction temperature (° C.) | 220 | 220 | 220 | 220 | 220 |
| Reaction time (hours) | 3 | 3 | 3 | 3 | 3 |
| Analysis results: | | | | | |
| AA (mole) | 0.096 | 0.104 | 0.115 | 0.085 | 0.108 |
| HCA (mole) | 0.191 | 0.160 | 0.158 | 0.237 | 0.203 |
| HDO (mole) | 0.588 | 0.589 | 0.586 | 0.528 | 0.543 |
| AA conversion (percent) | 66.7 | 63.9 | 60.2 | 70.6 | 62.3 |
| HCA selectivity (percent) | 97.0 | 85.1 | 87.8 | 88.4 | 88.3 |

EXAMPLE 42

An aqueous solution containing 300 g. of cobalt nitrate was added dropwise to an aqueous solution containing 120 g. of sodium hydroxide. The mixture was allowed to stand overnight, and the resulting precipitate was washed, filtered and dried. Then, the mixture was blended with 2.5 g. of zinc phosphate in a ball mill. The mixture was molded into pellets, and reduced at 330° C. directly without conducting the sintering treatment. With use of the so prepared catalyst, the reaction was carried out batchwise under the same conditions as in Example 1(b). Results of the analysis of the reaction mixtures obtained in these Examples 39–42 are shown in Table 10.

TABLE 10

| Example number | 39 | 40 | 41 | 42 |
|---|---|---|---|---|
| Amount (g.) of catalyst | 60 | 60 | 60 | 60 |
| Batch number | 2 | 5 | 1 | 1 |
| Feed composition: | | | | |
| AA fed (g.) | 42 | 42 | 42 | 42 |
| HDO fed (g.) | 70 | 70 | 70 | 70 |
| Water fed (g.) | 7 | 7 | 7 | 7 |
| Reaction conditions: | | | | |
| $H_2$ feed pressure (kg./cm.$^2$ g.) | 70 | 70 | 70 | 70 |
| Reaction temperature (° C.) | 220 | 220 | 220 | 220 |
| Reaction time (hours) | 3 | 3 | 3 | 3 |
| Analysis results: | | | | |
| AA (mole) | 0.101 | 0.109 | 0.101 | 0.112 |
| HCA (mole) | 0.192 | 0.164 | 0.188 | 0.157 |
| HDO (mole) | 0.577 | 0.582 | 0.559 | 0.583 |
| AA conversion (percent) | 64.9 | 62.2 | 64.9 | 61.1 |
| HCA selectivity (percent) | 94.6 | 86.3 | 85.1 | 84.4 |

EXAMPLES 43–46

(a) Preparation of catalyst

An aqueous solution of 600 g. of cobalt nitrate in 2 liters of water was added dropwise to an aqueous solution of 360 g. of ammonium carbonate in 3 liters of water at room temperature under violent agitation. The mixture was allowed to stand overnight, and the resulting precipitate was sufficiently washed with water, filtered and dried at 90–110° C. to obtain a powder of basic cobalt carbonate. To 200 g. of the so obtained powder 1.0 g. of rhenium heptoxide in the form of an aqueous solution, was added and the mixture was kneaded, dried, molded into pellets having a diameter of 5 mm. and a length of 3 mm., preliminarily reduced at 250° C. in a nitrogen current for 2 hours and reduced at 330° C. until generation of water was not substantially observed.

(b) Synthesis of ε-hydroxycaproic acid

A stainless steel autoclave of the vertical agitation type having an inner capacity of 100 cc. was charged with 14.0 g. of adipic acid, 24.0 g. of 1,6-hexanediol, 2.0 g. of water and 22 g. of the catalyst obtained in (2) above, and hydrogen gas was introduced into the autoclave under a pressure of 70 kg./cm.² g. The reaction was carried out at 210° C. for 2 hours batchwise. This procedure was repeated 30 times and the catalyst was used repeatedly throughout 30 runs. Results of the analysis of the obtained reaction mixtures are shown in Table 11.

EXAMPLES 47 AND 48

In the same manner as in Example 43(a) a catalyst was prepared by employing 4.0 g. (Example 47) or 0.2 g. (Example 48) of rhenium heptoxide instead of 1.0 g. of rhenium heptoxide in Example 43(a).

The synthesis reaction was carried out under the same conditions as in Example 43(b) by employing the so prepared catalysts. Results are shown in Table 11.

EXAMPLE 49

A catalyst was prepared in the same manner as in Example 43(a) except that 240 g. of potassium hydroxide were used instead of 360 g. of ammonium carbonate.

The synthesis reaction was carried out under the same conditions as in Example 43(b) with use of the so prepared catalyst to obtain the results shown in Table 11.

EXAMPLE 51

A catalyst was prepared in the same manner as in Example 50 except that 4.0 g. of boric acid were used instead of 3.0 g. of 85% phosphoric acid.

EXAMPLE 52

180 g. of ammonium carbonate were dissolved into 2 liters of water, and 1.8 g. of ammonium molybdate was added thereto to form a homogeneous mixed solution. Under sufficient agitation an aqeuous solution of 300 g. of cobalt nitrate in 1 liter of water was gradually added dropwise to the above homogeneous solution at room tempearture. The mixture was allowed to stand overnight, and the resulting precipitate was washed with water, filtered, dried at 90–110° C., molded into pellets having a diameter of 5 mm. and a length of 3 mm. and reduced at 330° C. in a hydrogen current to obtain a catalyst.

EXAMPLE 53

1.3 g. of tungstic acid was dissolved in 410 g. of 28% aqueous ammonia, and the solution was gradually added under sufficient agitation dropwise to an aqueous solution of 488 g. of cobalt nitrate in 2 liters of water at a temperature elevated at 80° C. The mixture was maintained at this temperature for 1 hour, and the resulting precipitate was washed with hot water, filtered at an elevated temperature, dried at 90–110° C., molded into pellets having a diameter of 5 mm. and a length of 3 mm. and reduced at 330° C. in a hydrogen current to obtain a catalyst.

EXAMPLES 54–57

The dried powder of basic cobalt carbonate incorporated with phosphoric acid, which was obtained in Example 50, was carefully subjected to thermal decomposition in air in a stainless steel vessel, molded into pellets, sintered at 600° C. for 4 hours and reduced in a hydrogen current at 400° C. to obtain a catalyst.

With use of the catalysts prepared in Examples 50, 51

TABLE 11

| Example number | 43 | 44 | 45 | 46 | 47 | 48 | 49 |
|---|---|---|---|---|---|---|---|
| Amount (g.) of catalyst | 22 | 22 | 22 | 22 | 20 | 25 | 25 |
| Batch number | 2 | 10 | 20 | 30 | 2 | 2 | 2 |
| Feed composition: | | | | | | | |
| AA fed (g.) | 14 | 14 | 14 | 14 | 14 | 14 | 14 |
| HDO fed (g.) | 24 | 24 | 24 | 24 | 24 | 24 | 24 |
| Water fed (g.) | 2 | 2 | 2 | 2 | 2 | 2 | 2 |
| Reaction conditions: | | | | | | | |
| $H_2$ feed pressure (kg./cm.² g.) | 70 | 70 | 70 | 70 | 70 | 70 | 70 |
| Reaction temperature (° C.) | 210 | 210 | 210 | 210 | 210 | 210 | 210 |
| Reaction time (hours) | 2 | 2 | 2 | 2 | 2 | 2 | 2 |
| Analysis results: | | | | | | | |
| AA (mole) | 0.0278 | 0.0299 | 0.0272 | 0.0324 | 0.0316 | 0.0332 | 0.0318 |
| HCA (mole) | 0.0688 | 0.0630 | 0.0612 | 0.0616 | 0.0609 | 0.0644 | 0.0619 |
| HDO (mole) | 0.1814 | 0.1975 | 0.2044 | 0.2068 | 0.1884 | 0.1931 | 0.1906 |
| AA conversion (percent) | 71.0 | 68.8 | 71.6 | 67.0 | 66.2 | 65.4 | 66.8 |
| HCA selectivity (percent) | 76.5 | 87.9 | 90.7 | 102.8 | 76.0 | 88.5 | 80.7 |
| Ratio of formation of side products (percent) | 6.1 | 3.7 | 4.8 | 4.0 | 13.8 | 3.8 | 6.5 |

EXAMPLE 50

200 g. of the dried powder of basic cobalt carbonate obtained in Example 43(a) were incorporated with 3.0 g. of 85% phosphoric acid in the form of an aqueous solution, and the mixture was kneaded, dried at 90–110° C., molded into pellets having a diameter of 5 mm. and a length of 3 mm. and reduced at 330° C. in a nitrogen current to obtain a catalyst.

and 54–57, the synthesis reaction was carried out batchwise under the same conditions as in Example 43(b). The reaction was repeated 30 times and each catalyst was used repeatedly throughout 30 runs. Results are shown in Table 12.

With use of the catalyst prepared in Examples 52 and 53, the synthesis reaction was carried out batchwise under the same conditions as in Example 1(b). Results are shown in Table 12.

TABLE 12

| Example number | 50 | 51 | 52 | 53 | 54 | 55 | 56 | 57 |
|---|---|---|---|---|---|---|---|---|
| Amount (g.) of catalyst | 20 | 20 | 55 | 60 | 25 | 25 | 25 | 25 |
| Batch number | 2 | 2 | 2 | 2 | 2 | 10 | 20 | 30 |
| Feed composition: | | | | | | | | |
| AA fed (g.) | 14 | 14 | 42 | 42 | 14 | 14 | 14 | 14 |
| HDO fed (g.) | 24 | 24 | 70 | 70 | 24 | 24 | 24 | 24 |
| Water fed (g.) | 2 | 2 | 7 | 7 | 2 | 2 | 2 | 2 |
| Reaction conditions: | | | | | | | | |
| $H_2$ feed pressure (kg./cm.$^2$ g.) | 70 | 70 | 70 | 70 | 70 | 70 | 70 | 70 |
| Reaction temperature (° C.) | 210 | 210 | 220 | 220 | 210 | 210 | 210 | 210 |
| Reaction time (hours) | 2 | 2 | 3 | 3 | 2 | 2 | 2 | 2 |
| Analysis results: | | | | | | | | |
| AA (mole) | 0.0347 | 0.0363 | 0.099 | 0.103 | 0.0355 | 0.0377 | 0.0404 | 0.0391 |
| HCA (mole) | 0.0665 | 0.0512 | 0.193 | 0.218 | 0.0537 | 0.0497 | 0.0498 | 0.0531 |
| HDO (mole) | 0.1960 | 0.2078 | 0.582 | 0.551 | 0.2095 | 0.2153 | 0.2069 | 0.2060 |
| AA conversion (percent) | 68.3 | 62.1 | 65.5 | 64.2 | 62.9 | 60.7 | 57.8 | 59.2 |
| HCA selectivity (percent) | 97.2 | 93.1 | 96.5 | 96.0 | 99.3 | 107.8 | 96.1 | 98.3 |
| Ratio of formation of side products (percent) | | | | | | 3.5 | 3.3 | 3.8 | 3.2 |

EXAMPLE 58

60 g. of powder of cobalt oxide obtained in Comparative Example 1 by adding the aqueous solution of cobalt nitrate dropwise to the aqueous solution of ammonium carbonate followed by washing, filtering and preliminary sintering at 90–110° C., was impregnated with an aqueous solution containing 4.0 g. of triammonium phosphate [$(NH_4)_3PO_4.3H_2O$]. The impregnated powder was dried, sintered at 600° C. for 4 hours and reduced at 330° C. to obtain a catalyst.

EXAMPLE 59

A catalyst was prepared in the same manner as in Example 58 except that 1.2 g. of ammonium borate was employed instead of 4.0 g. of triammonium phosphate.

EXAMPLE 60

A catalyst was prepared in the same manner as in Example 58 except that 1.2 g. of ammonium molybdate was employed instead of 4.0 g. of triammonium phosphate.

EXAMPLE 61

A catalyst was prepared in the same manner as in Example 61 except that 1.0 g. of ammonium tungstate was employed instead of 4.0 g. of triammonium phosphate.

With use of catalysts prepared in Examples 58–61, the synthesis reaction was carried out under the same conditions as adopted in Example 43(b). Results are shown in Table 13.

TABLE 13

| Example number | 58 | 59 | 60 | 61 |
|---|---|---|---|---|
| Amount (g.) of catalyst | 25 | 25 | 25 | 25 |
| Batch number | 2 | 2 | 2 | 2 |
| Feed composition: | | | | |
| AA fed (g.) | 14 | 14 | 14 | 14 |
| HDO fed (g.) | 24 | 24 | 24 | 24 |
| Water fed (g.) | 2 | 2 | 2 | 2 |
| Reaction conditions: | | | | |
| $H_2$ feed pressure (kg./cm.$^2$ g.) | 70 | 70 | 70 | 70 |
| Reaction temperature (° C.) | 210 | 210 | 210 | 210 |
| Reaction time (hours) | 2 | 2 | 2 | 2 |
| Analysis results: | | | | |
| AA (mole) | 0.0283 | 0.0287 | 0.0253 | 0.0291 |
| HCA (mole) | 0.0784 | 0.0742 | 0.0688 | 0.0662 |
| HDO (mole) | 0.1889 | 0.1858 | 0.1911 | 0.1880 |
| AA conversion (percent) | 70.5 | 70.0 | 73.6 | 69.6 |
| HCA selectivity (percent) | 95.7 | 87.7 | 83.2 | 80.7 |

EXAMPLES 62–68

An autoclave of the vertical agitation type having an inner capacity of 300 cc. was charged with amounts of adipic acid, 1,6-hexanediol and water, indicated in Table 14 and 55 g. of the catalyst obtained in Example 1(a), and the reaction was carried out under conditions indicated in Table 14. Results are shown in Table 14.

Examples 62–65 were conducted to examine influences of the hydrogen partial pressure. Especially, in Example 63(3) the hydrogen partial pressure was reduced stepwise from the upper level to the lower level so as to examine effects attained by the stepwise reduction of the hydrogen partial pressure. In this Example 63(3), the amount of ε-hydroxycaproic acid formed per unit weight of the catalyst per unit time was 1.9 moles per kg. of the catalyst per hour, which is superior to the amount of ε-hydroxycaproic acid of 0.6 mole per kg. of the catalyst per hour.

Examples 66–68 were conducted to examine influences of the reaction temperature.

TABLE 14

| Example number | 62 | 63(1) | 63(2) | 63(3) | 64 | 65 | 66 | 67 | 68 |
|---|---|---|---|---|---|---|---|---|---|
| Amount (g.) of catalyst | 55 | 55 | 55 | 55 | 55 | 55 | 55 | 55 | 55 |
| Feed composition: | | | | | | | | | |
| AA fed (g.) | 42 | 42 | 42 | 42 | 42 | 42 | 42 | 42 | 42 |
| HDO fed (g.) | 70 | 70 | 70 | 70 | 70 | 70 | 70 | 70 | 70 |
| Water fed (g.) | 7 | 7 | 7 | 7 | 7 | 7 | 7 | 7 | 7 |
| Reaction conditions: | | | | | | | | | |
| $H_2$ feed pressure (kg./cm.$^2$ g.) | 45 | 50 | 50 | 100 40 | 70 | 100 | 50 | 50 | 50 |
| Reaction temperature (° C.) | 220 | 220 | 220 | 220 220 | 220 | 220 | 200 | 240 | 260 |
| Reaction time (hours) | 2 | 2 | 6 | 1 1 | 2 | 2 | 2 | 2 | 2 |
| Analysis results: | | | | | | | | | |
| AA (mole) | 0.174 | 0.152 | 0.079 | 0.062 | 0.130 | 0.084 | 0.166 | 0.136 | 0.125 |
| HCA (mole) | 0.113 | 0.201 | 0.214 | 0.206 | 0.209 | 0.205 | 0.102 | 0.238 | 0.230 |
| HDO (mole) | 0.568 | 0.533 | 0.560 | 0.585 | 0.520 | 0.487 | 0.590 | 0.496 | 0.413 |
| AA conversion (percent) | 39.6 | 47.2 | 72.6 | 78.3 | 54.9 | 70.8 | 42.4 | 52.8 | 56.6 |
| HCA selectivity (percent) | 81.3 | 102.6 | 88.2 | 88.4 | 90.5 | 66.1 | 81.6 | 95.6 | 67.1 |

EXAMPLES 69–73

An autoclave was charged with 52 g. of a mixture of carboxylic acids obtained by the liquid phase oxidation of cyclohexane (formed by distilling a portion of the water from an aqueous solution of a carboxylic acid mixture comprising 36 mole percent of adipic acid, 30 mole percent of ε-hydroxycaproic acid, 4 mole percent of formylvalerianic acid, 6 mole percent of glutaric acid and 21 mole percent of other substances and thus adjusting the water content to 10% by weight), 67 g. of 1,6-hexanediol and 60 g. of the catalyst obtained in Example 1(a). Hydrogen was introduced into the autoclave under a pressure of 70 kg./cm.$^2$ g. and the reaction was carried out at 220° C. for 3 hours. The reaction was repeated batchwise 30 times and the catalyst was used repeatedly throughout 30 runs. Results of the analysis of the starting material and reaction mixture are shown in Table 15.

TABLE 15

| Example number | 69 | 70 | 71 | 72 | 73 |
|---|---|---|---|---|---|
| Batch number | 2 | 5 | 10 | 20 | 30 |
| Starting material: | | | | | |
| FVA [1] (mole/kg.) | 0.153 | 0.153 | 0.153 | 0.153 | 0.153 |
| AA (mole/kg.) | 1.061 | 0.061 | 1.061 | 1.061 | 1.061 |
| HCA (mole/kg.) | 0.892 | 0.892 | 0.892 | 0.892 | 0.892 |
| HDO (mole/kg.) | 4.167 | 4.167 | 4.167 | 4.167 | 4.167 |
| Reaction conditions: | | | | | |
| H$_2$ feed pressure (kg./cm.$^2$ g.) | 70 | 70 | 70 | 70 | 70 |
| Reaction temperature (° C.) | 220 | 220 | 220 | 220 | 220 |
| Reaction time (hours) | 3 | 3 | 3 | 3 | 3 |
| Analysis results: | | | | | |
| AA (mole/kg.) | 0.404 | 0.415 | 0.422 | 0.429 | 0.446 |
| HCA (mole/kg.) | 1.767 | 1.716 | 1.481 | 1.535 | 1.486 |
| HDO (mole/kg.) | 3.929 | 4.090 | 4.247 | 4.147 | 4.261 |
| AA conversion (percent) | 66.7 | 65.8 | 65.2 | 64.7 | 63.3 |
| HCA selectivity (percent) | 91.1 | 97.1 | 92.3 | 90.5 | 94.9 |

[1] FVA=formylvalerianic acid.

EXAMPLES 74–77

Succinic acid, azelaic acid, sebacic acid and decane dicarboxylic acid were chosen as the saturated aliphatic dicarboxylic acid, and they were reacted together with the corresponding glycols, i.e., 1,4-butanediol, 1,9-nonanediol, 1,10-decanediol and 1,12-dodecanediol, respectively, under conditions indicated in Table 16 by employing a catalyst prepared in the same manner as described in Example 1(a). Results are shown in Table 16.

Values of the conversion of the starting dicarboxylic acid and the selectivity of the resulting ω-hydroxy monocarboxylic acid shown in Table 16 are those calculated in the same manner as the values of the conversion of adipic acid and the selectivity of ε-hydroxycaproic acid.

cobalt adipate and 55 g. of a catalyst prepared in the same manner as described in Example 1(a), and hydrogen gas was introduced into the autoclave under a pressure of 70 kg./cm.$^2$ g. The reaction was carried out for 3 hours at 220° C. As a result of the analysis of the reaction mixture it was found that the reaction mixture comprised 0.079 mole of adipic acid, 0.214 mole of ε-hydroxycaproic acid and 0.560 mole of 1,6-hexandediol. Thus, the conversion of adipic acid was 72.6% and the selectivity of ε-hydroxycaproic acid was 88.2%. The above procedure was repeated 50 times batchwise while cobalt adipate was added freshly at each run and the catalyst was used repeatedly throughout 50 runs. As a result of the analysis of the reaction mixture from the 50th batch, it was found that at the 50th run the conversion of adipic acid was 66.7% and the selectivity of ε-hydroxycaproic acid was 95.0%.

EXAMPLE 87

(a) Synthesis of Ester of Adipic Acid With 1,6-Hexanediol and/or Its Oligomer (Synthesis of Cyclization Residue)

Low boiling substances such as water were removed from the reaction mixture obtained in Example 1(b), and then a great part of free 1,6-hexanediol was removed therefrom at 120° C. under a pressure of 1 mm. Hg. As a result 80 g. of the residue was obtained. The residue was charged in a vessel of an inner capacity of 200 cc. equipped with a packed rectification column with a theoretical stage number of 9, and the reaction was car-

TABLE 16

| Example number | 74 | 75 | 76 | 77 |
|---|---|---|---|---|
| Saturated aliphatic dicarboxylic acid: | | | | |
| Kind | Succinic acid | Azelaic acid | Sebacic acid | 1,10-decane dicarboxylic acid. |
| Number of carbon atoms | 4 | 9 | 10 | 12. |
| Amount (g.) | 20.0 | 12.0 | 8.0 | 22.0. |
| Glycol: | | | | |
| Kind | 1,4-butanediol | 1,9-nonanediol | 1,10-decanediol | 1,12-dodecanediol. |
| Amount (g.) | 15.0 | 20.0 | 20.0 | 25.0. |
| Water (g.) | 6.0 | 4.0 | 3.0 | 10.0. |
| Reaction conditions: | | | | |
| H$_2$ feed pressure (kg./cm.$^2$ g.) | 80 | 70 | 70 | 60. |
| Reaction temperature (° C.) | 230 | 220 | 220 | 230. |
| Reaction time (hours) | 4 | 3 | 3 | 4. |
| Analysis results: | | | | |
| Conversion of dicarboxylic acid (percent). | 75.7 | 59.0 | 57.7 | 61.5. |
| Kind of resulting ω-hydroxymonocarboxylic acid. | γ-butyrolactone | 9-hydroxypelargonic acid | 10-hydroxydecanoic | 12-hydroxylauric acid. |
| Selectivity of ω-hydroxymonocarboxylic acid (percent). | 91.0 | 89.1 | 86.2 | 90.3. |

EXAMPLES 78–85

An autoclave of the vertical agitation type having an inner capacity of 300 cc. was charged with the amounts of adipic acid, 1,6-hexanediol and water, indicated in Table 17 and 60 g. of a catalyst prepared in the same manner as described in Example 1(a), and the reaction was carried out at 220° C. for 3 hours under conditions indicated in Table 17. Results are shown in Table 17.

ried out at 240° C. under a pressure of 30 mm. Hg for 3 hours to recover 0.196 mole of ε-hydroxycaproic acid as ε-caprolactone together with 0.294 mole of 1,6-hexane diol from the head of the rectification column. In the vessel 0.086 mole of adipic acid, 0.022 mole of ε-hydroxycaproic acid and 0.130 mole of 1,6-hexanediol remained. In this cyclization residue, the adipic acid took a form of a low-molecular-weight polyester with 1,6-hexanediol.

TABLE 17

| Example number | 78 | 79 | 1 | 80 | 81 | 82 | 83 | 84 | 85 |
|---|---|---|---|---|---|---|---|---|---|
| Starting material: | | | | | | | | | |
| Amount of AA (g.) | 42 | 42 | 42 | 42 | 30 | 15 | 42 | 42 | 42 |
| Amount of HDO (g.) | 70 | 48 | 70 | 102 | 120 | 180 | 70 | 70 | 70 |
| HDO/AA (g./g.) | 1.67 | 1.42 | 1.67 | 2.43 | 4.00 | 12.0 | 1.67 | 1.67 | 1.67 |
| Amount of water (g.) | | 7 | 7 | 7 | 5 | 2.5 | 10.3 | 20.6 | 41.2 |
| Water/AA (mole/mole) | 0 | 1.35 | 1.35 | 1.35 | 1.36 | 1.36 | 2.0 | 4.0 | 8.0 |
| Reaction conditions: | | | | | | | | | |
| H$_2$ feed pressure (kg./cm.$^2$ g.) | 70 | 70 | 70 | 70 | 70 | 70 | 70 | 70 | 70 |
| Reaction temperature (° C.) | 220 | 220 | 220 | 220 | 220 | 220 | 220 | 220 | 220 |
| Reaction time (hours) | 3 | 3 | 3 | 3 | 3 | 3 | 3 | 3 | 3 |
| Analysis results: | | | | | | | | | |
| AA (mole) | 0.107 | 0.112 | 0.086 | 0.109 | 0.073 | 0.036 | 0.090 | 0.111 | 0.122 |
| HCA (mole) | 0.157 | 0.136 | 0.218 | 0.176 | 0.153 | 0.132 | 0.211 | 0.147 | 0.140 |
| HDO (mole) | 0.523 | 0.413 | 0.570 | 0.803 | 0.980 | 1.370 | 0.562 | 0.583 | 0.578 |
| AA conversion (percent) | 62.8 | 61.1 | 70.0 | 62.1 | 64.4 | 65.0 | 68.8 | 61.5 | 57.7 |
| HCA selectivity (percent) | 62.5 | 79.5 | 96.7 | 73.3 | 89.0 | 58.2 | 92.1 | 78.6 | 77.3 |

EXAMPLE 86

An autoclave of the vertical agitation type having an inner capacity of 300 cc. was charged with 42 g. of adipic acid, 70 g. of 1,6-hexanediol, 7 g. of water, 0.2 g. of (b) Synthesis of ε-Hydroxycaproic acid An autoclave of the vertical agitation type having an inner capacity of 300 cc. was charged with 90 g. of a cyclization residue formed in the same manner as in (a)

above (comprising 0.270 mole of adipic acid, 0.069 mole of ε-hydroxycaproic acid and 0.408 mole of 1,6-hexanediol), 13 g. of water, 11 g. of 1,6-hexanediol and 60 g. of a catalyst prepared in the same manner as in Example 1(a) and hydrogen gas was introduced into the autoclave under a pressure of 70 kg./cm.² g. The reaction was carried out at 225° C. for 3 hours.

As a result of the analysis of the reaction mixture, it was found that the reaction mixture comprised 0.089 mole of adipic acid, 0.256 mole of ε-hydroxycaproic acid and 0.480 mole of 1,6-hexanediol.

When the calculation was conducted while reducing the amount of ε-hydroxycaproic acid contained in the starting cyclization residue from the amount formed of ε-hydroxycaproic acid, it was found that the conversion of adipic acid was 67.0% and the selectivity of ε-hydroxycaproic acid was 92.6%.

What we claim is:

1. A process for the preparation of ω-hydroxy saturated aliphatic monocarboxylic acids of 4 to 12 carbon atoms which comprises contacting a saturated aliphatic dicarboxylic acid of 4 to 12 carbon atoms, together with a saturated aliphatic glycol containing the same number of carbon atoms as said dicarboxylic acid in an amount 0.3 to 20 weight times as great as the amount of said dicarboxylic acid, with hydrogen at a temperature within the range of from 180 to 300° C. and under such a pressure to provide a hydrogen partial pressure of 10 to 150 kg./cm.² in the presence of a catalyst consisting essentially of (1) metallic cobalt derived by reducing with hydrogen at least one cobalt compound selected from the group consisting of cobalt oxides, cobalt carbonates and cobalt hydroxides and (2) a metal, metal compound or mixture thereof derived by reducing with hydrogen at least one compound selected from the group consisting of phosphates, borates, molybdates and tungstates of iron, zinc and cobalt, oxides and hydroxides of iron, rhenium, zinc, phosphorus, boron, molybdenum and tungsten, and carbonates of iron and zinc.

2. The process of claim 1, wherein said catalyst is one prepared by reducing at least one cobalt compound selected from the group consisting of cobalt oxides, cobalt carbonates and cobalt hydroxides and at least one compound selected from the group consisting of phosphates, borates, molybdates and tungstates of iron, zinc and cobalt, oxides and hydroxides of iron, rhenium, zinc, phosphorus, boron, molybdenum and tungsten, and carbonates of iron and zinc, with hydrogen at 200 to 600° C.

3. The process of claim 1, wherein said catalyst is one in which at least one metal selected from the group consisting of iron, rhenium, zinc, phosphorus, boron, molybdenum and tungsten or at least one compound of such metal contained in the reduced product of (2) is present in such amount, calculated as metal, that the atomic ratio ($k$) of (metal of (2)/(metallic cobalt derived from (1)) is 0.01–10/100.

4. The process of claim 3 wherein said catalyst has an atomic ratio ($k$) of 0.1–4/100.

5. The process of claim 1, wherein said catalyst is one prepared by sintering a mixture of (1) an oxide, hydroxide or carbonate (of cobalt) and (2) at least one compound selected from the group consisting of phosphates, borates, molybdates and tungstates of iron, zinc and cobalt, oxides and hydroxides of iron, rhenium, zinc, phosphorus, boron, molybdenum and tungsten, and carbonates of iron and zinc in an oxygen-containing gas atmosphere at a temperature ranging from 300 to 1600° C., and reducing the sintered product with hydrogen at 200 to 600° C.

6. The process of claim 5, wherein said catalyst is one prepared by molding a mixture of (1) an oxide of cobalt and (2) at least one compound of (2), sintering the molded product in an oxygen-containing gas atmosphere at a temperature ranging from 400 to 1000° C. and reducing the sintered product with hydrogen at 250 to 500° C.

7. The process of claim 1, wherein water is present in the reaction system in an amount not exceeding 10 molar times the saturated aliphatic dicarboxylic acid of 4 to 12 carbon atoms.

8. The process of claim 7, wherein water is present in the reaction system in an amount of 0.5 to 8 molar times the saturated aliphatic dicarboxylic acid.

9. The process of claim 1, wherein the saturated aliphatic dicarboxylic acid is contacted with hydrogen together with a saturated aliphatic glycol having the same number of carbon atoms as the dicarboxylic acid in an amount 0.5 to 5 weight times as great as the amount of the dicarboxylic acid at a temperature ranging from 200 to 270° C. under a pressure to provide a hydrogen partial pressure of 20 to 100 kg./cm.².

10. The process of claim 1, wherein an adipic acid-containing oxidation product obtained by oxidizing cyclohexane with molecular oxygen is used as the saturated aliphatic dicarboxylic acid.

11. The process of claim 1, wherein the saturated aliphatic dicarboxylic acid is used in the form of an ester with a saturated aliphatic glycol having the same number of carbon atoms as the dicarboxylic acid.

References Cited
UNITED STATES PATENTS

| | | | |
|---|---|---|---|
| 3,708,534 | 1/1973 | Ishimoto et al. | 260—535 R |
| 1,962,140 | 6/1934 | Dreyfus | 260—535 |
| 2,904,584 | 9/1959 | Payne et al. | 260—535 |

LORRAINE A. WEINBERGER, Primary Examiner

R. D. KELLY, Assistant Examiner

U.S. Cl. X.R.

252—432, 435, 455, 458, 459, 465, 466, 470, 472, 473; 260—343, 413, 484 A